United States Patent
Schlomka et al.

(10) Patent No.: US 7,529,341 B2
(45) Date of Patent: May 5, 2009

(54) AUTOMATIC MATERIAL DISCRIMINATION BY USING COMPUTER TOMOGRAPHY

(75) Inventors: Jens-Peter Schlomka, Hamburg (DE);
Geoffrey Harding, Hamburg (DE);
Bernd Schreiber, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 96 days.

(21) Appl. No.: 10/546,392

(22) PCT Filed: Feb. 10, 2004

(86) PCT No.: PCT/IB2004/000427

§ 371 (c)(1), (2), (4) Date: Aug. 18, 2005

(87) PCT Pub. No.: WO2004/074871

PCT Pub. Date: Sep. 2, 2004

(65) Prior Publication Data

US 2006/0083346 A1 Apr. 20, 2006

(30) Foreign Application Priority Data

Feb. 24, 2003 (EP) .................................. 03100443

(51) Int. Cl.
*G01N 23/10* (2006.01)
*G01N 23/083* (2006.01)
*G01N 23/20* (2006.01)
*G01N 23/201* (2006.01)

(52) U.S. Cl. .............................. 378/90; 378/6; 378/57; 378/70; 378/71; 378/86; 378/87; 378/88

(58) Field of Classification Search ...................... 378/6, 378/7, 19, 53, 57, 70, 71, 86, 88, 90, 87
See application file for complete search history.

(56) References Cited

U.S. PATENT DOCUMENTS

| | | | | |
|---|---|---|---|---|
| 5,007,072 A * | 4/1991 | Jenkins et al. | ................. | 378/88 |
| 5,270,926 A * | 12/1993 | Tam | ............................... | 378/4 |
| 5,367,552 A | 11/1994 | Peschmann | | |
| 5,600,303 A | 2/1997 | Husseiny et al. | | |
| 5,642,393 A | 6/1997 | Krug et al. | | |
| 5,712,926 A * | 1/1998 | Eberhard et al. | ............ | 382/205 |
| 5,838,758 A * | 11/1998 | Krug et al. | ..................... | 378/53 |

(Continued)

FOREIGN PATENT DOCUMENTS

EP 0 127 546 A1 12/1984

(Continued)

OTHER PUBLICATIONS

Jens-Peter Schlomka, Johannes Delfs, Hans Barschdorf, Axel Thran, and Udo van Stevendaal. Developments in X-Ray Tomography IV (Ulrich Bonse, Editor), Prodeedings of SPIE vol. 5535 (2004), p. 410-423.*

(Continued)

*Primary Examiner*—Allen C. Ho

(57) ABSTRACT

Method and apparatus are provided for combining information obtained from CT and Coherent Scatter Computed Tomography to better determine whether there are dangerous materials in the baggage or not. Hence, the attenuation coefficient and the diffraction pattern of the item of baggage are used to determine whether the baggage should be cleared.

6 Claims, 4 Drawing Sheets

U.S. PATENT DOCUMENTS

| | | | |
|---|---|---|---|
| 6,470,067 B1* | 10/2002 | Harding | 378/19 |
| 6,744,845 B2* | 6/2004 | Harding et al. | 378/16 |
| 6,788,761 B2* | 9/2004 | Bijjani et al. | 378/57 |
| 6,856,667 B2* | 2/2005 | Ellengogen | 378/57 |
| 6,879,657 B2* | 4/2005 | Hoffman | 378/7 |
| 7,023,956 B2* | 4/2006 | Heaton et al. | 378/57 |
| 7,092,485 B2* | 8/2006 | Kravis | 378/57 |
| 7,099,436 B2* | 8/2006 | Francke et al. | 378/62 |
| 7,263,160 B2* | 8/2007 | Schlomka et al. | 378/57 |
| 7,366,281 B2* | 4/2008 | Skatter | 378/57 |
| 7,366,282 B2* | 4/2008 | Peschmann | 378/57 |
| 2002/0150202 A1* | 10/2002 | Harding et al. | 378/16 |
| 2005/0129169 A1* | 6/2005 | Donnelly et al. | 378/5 |
| 2006/0098773 A1* | 5/2006 | Peschmann | 378/57 |
| 2006/0104414 A1* | 5/2006 | Mayo | 378/57 |
| 2006/0165217 A1* | 7/2006 | Skatter | 378/57 |
| 2006/0171502 A1* | 8/2006 | Schlomka et al. | 378/6 |
| 2006/0203960 A1* | 9/2006 | Schlomka et al. | 378/57 |
| 2007/0019782 A1* | 1/2007 | Van Stevendaal et al. | 378/6 |
| 2007/0127621 A1* | 6/2007 | Grass et al. | 378/4 |
| 2007/0140410 A1* | 6/2007 | Van Stevendaal et al. | 378/7 |

FOREIGN PATENT DOCUMENTS

| | | |
|---|---|---|
| EP | 127546 A2 | 12/1984 |
| GB | 2359720 | 8/2001 |

OTHER PUBLICATIONS

Stefan M. Schneider, Jens-Peter Schlomak, and Geoffrey Harding. Medical Imaging 2001: Physicsof Medical Imaging (Larry E. Antonuk and Martin J. Yaffe, Editors), Proceedings of SPIE vol. 4320 (2001), p. 754-763.*

J. P. Schlomka, S. M. Schneider, and G. Harding. Penetrating Radiation Systems and Applications II (F. Patrick Doty, H. Bradford Barber, Hans Roehrig, Edward J. Morton, Editors), Proceedings of SPIE vol. 4142 (2000), p. 218-224.*

G. Harding and B. Schreiber. Radiation Physics and Chemistry 56 (1999), 229-245.*

Michael S. Westmore, Aaron Fenster, Ian A. Cunningham, "A Novel Coherent-Scatter Computed Tomography System," Engineering in Medicine and Biology Society, vol. 1, 581-582, IEEE 1995.*

Atsunori Hoshino et al., "A Coherent Scatter Computed Tomography with Scintillator-CCD System," Engineering in Biology and Medicine Society, vol 2, 726-727, IEEE 1996.*

J. P. Schlomka, A. Harding, G. Harding, U. van Stevendaal, M. Grass, "Coherent Scatter X-ray Computed Tomography in Medical Applications," 900-901, Nuclear Science Symposium Conference Record, IEEE 2002.*

J. Delfs and J. P. Schlomka, "Energy-dispersive coherent scatter computed tomography," Applied Physics Letters 88, 243506 (2006).*

* cited by examiner

AUTOMATIC MATERIAL DISCRIMINATION BY USING COMPUTER TOMOGRAPHY

The present invention relates to the field of material discrimination. In particular, the present invention relates to an inspection system for detecting a specific material of interest in an object such as an item of baggage, a method of inspecting an object such as an item of baggage and to a computer program stored on a computer readable medium.

Over the past several years, x-ray baggage inspections have evolved from simple x-ray imaging systems that were completely dependent on interaction by an operator to more sophisticated automatic systems that can automatically recognize certain types of contrabands and trigger all dangerous materials. The newer inspection systems have employed single energy or dual energy x-ray radiation transmitted through or scattered from the examined package. Some systems have used a single view source detector arrangement, others have utilized a dual view or multi-view arrangements. The single or dual view systems usually scan baggage, as it moves on a conveyer, using a scan beam or scanning pencil beam of x-rays in a fixed geometry. The multi-view, computer tomography (CT) type systems usually scan stationary baggage in a fixed geometry of scan angles and process data corresponding to absorption of x-rays to reconstruct selected slices of the baggage. Known CT-scanners also apply helical scanning mode, thus producing 3D images of the attenuation coefficient of the object.

At airports, the baggage inspection procedure is usually divided in to at least 2 levels of inspection. A first level system processes baggage rapidly, up to a rate of 1500 bags per hour. This first level system is located at a first inspection station and inspects all baggage. The system rapidly scans baggage and automatically makes a decision based on its particular modes of detection and methodology. Usually, CT scanners or dual energy transmission X-ray are used as first level systems, which determines the attenuation coefficient of the bag or of an area of the bag. Subsequently, the attenuation coefficient is compared to the attenuation coefficient of dangerous materials. In case the attenuation coefficient of the scanned item of baggage matches the known attenuation coefficient of a dangerous material, an alarm is issued or the item of baggage is separated from the main stream of baggage for further inspection.

In case there is a group of materials consisting of non-dangerous materials and dangerous materials having an attenuation coefficient that matches the attenuation coefficient of the item of baggage, the item of baggage is forwarded to the second level. At the second level an operator usually visually inspects an x-ray image of the rejected item of baggage and attempts to determine whether a suspicious object inside the item of baggage can be cleared based on its obvious shape. The operator searches the image for characteristic objects such as weapons, timing and detonation devices, wires or other characteristics associated with the contraband. In case the operator cannot clear the item of baggage, vapor or trace detectors or further CT scanners may be used to further inspect the item of baggage.

Reference EP 127 546 A2 discloses a computer tomograph using primary radiation as well as diffraction radiation for determining an examination result.

Reference U.S. Pat. No. 5,642,393 discloses an inspection system comprising a multi-view x-ray inspection probe constructed to employ x-ray radiation transmitted through or scattered from an examining item to identify a suspicious region inside the examined item. The multi-view x-ray inspection probe is constructed to identify the suspicious region using several examination angles of the transmitted or scattered x-ray radiation. Furthermore, the multi-view x-ray inspection probe is constructed to obtain spatial information of the suspicious region to determine a geometry for subsequent examination. Furthermore, a directional, material sensitive probe is provided, constructed to acquire material specific information about the suspicious region by employing the geometry. On the basis of the material specific information, a presence of a specific material in the specific region is determined.

It is an object of the present invention to provide for an unambiguous automatic material discrimination.

According to an exemplary embodiment of the present invention, the above object may be achieved with an inspection system for detecting a specific material of interest in an item of baggage, with the inspection system comprising a first scanner system for determining an attenuation coefficient of the item of baggage, a second scanner system for determining a diffraction pattern of the item of baggage and a calculation unit connected to the first and second scanner systems for identifying a presence of the specific material of interest in the item of baggage on the basis of the attenuation coefficients and the diffraction pattern. Advantageously according to this exemplary embodiment of the present invention, a very reliable identification of the specific material of interest can be provided. Also, since the attenuation coefficient of the item of baggage can be determined very rapidly, a two step process can be realized with the inspection system according to this exemplary embodiment of the present invention by using the first scanner system as the first level system screening the flow of baggage for "suspicious bags" where the "suspicious" bags are then further inspected by using the diffraction pattern of the item of baggage. Advantageously, since the diffraction pattern allows for a very reliable determination of the material of interest, a fault rate of the inspection system according to this exemplary embodiment of the present invention is reduced significantly.

According to the exemplary embodiment of present invention, the first and second scanner systems are arranged at a distance from each other, allowing to provide for example a conveyer belt switch between the first and second scanner systems such that a "suspicious" item of baggage may easily be branched off and does not have to pass the second scanner system. For example, a plurality of first scanner systems may be connected by conveyer belts and respective conveyer belt switches to the second system to thereby insure a high utilization ratio of the second scanner system.

According to another exemplary embodiment of the present invention, the first scanner system is a CT scanner system and the second scanner system is a coherent-scatter CT system. Advantageously, this allows the use of known first level CT scanners in the inspection system according to the present invention, in combination with a coherent-scatter CT system (CSCT).

According to another exemplary embodiment of the present invention, the first and the second scanner systems are realized as one scanner system having one source of radiation and one detector system. For implementing the CT scanner for determining the attenuation coefficient of the item of baggage, a first aperture system is provided between the source of radiation and the item to be scanned. To implement the CSCT scanner for determining the diffraction pattern of the item of baggage, a second aperture system such as a slot aperture or diaphragm is provided to form the radiation of the one source of radiation into a fan beam. Advantageously, this exemplary embodiment of the present invention has compact dimensions and may easily be installed in airport security systems where space is very often a problem. Furthermore, since only one source of radiation and one detector system is necessary, the costs for manufacturing such a system can be provided as well as the amount of moving parts underlying wear and tear can be reduced.

According to another exemplary embodiment of the present invention, a method of inspecting an item of baggage includes scanning the item of baggage at a first scanner stage for determining an attenuation coefficient of the item of baggage, determining whether there is a suspicious region in the item of baggage on the basis of the attenuation coefficient, scanning an area of the item of baggage including the suspicious region at a second scanner stage for determining a diffraction pattern of the area and determining whether there is dangerous material in the item of baggage on the basis of the diffraction pattern. Advantageously, this exemplary embodiment of the present invention allows for a two step inspection process allowing to make the inspection process very efficient and dependable. The use of the diffraction pattern to determine whether there is dangerous material or not allows for a very low fault rate of the method.

Further exemplary embodiments according to the present invention provide for a fast and efficient inspection of items of baggage while minimizing computation efforts necessary when these methods are applied on computerized inspection systems. In particular, the issuance of a plurality of alarms with respect to whether a dangerous material has been identified in the item of baggage or whether there is material in an item of baggage which cannot be identified allows an operator of the inspection system to easily identify the item of baggage in question and to identify the reason for the alarm.

Another embodiment relates to a computer program stored on a computer readable medium which executes the steps of the method according to the present invention when executed on an inspection system. Advantageously, this computer program allows for a reduction of computation power in the inspection system.

It may be seen to be the gist of an exemplary embodiment of the present invention that a conventional CT-system is used for determining the attenuation coefficient in a first stage to identify the material under investigation. However, in case the result is ambiguous, information obtained from a CT-system and from a CSCT-system is combined to better discriminate materials. In medical applications this procedure can be used to distinguish between healthy and non-healthy tissue. In baggage inspection applications, materials with similar attenuation can be distinguished resulting in a lower false alarm rate of the system and therefore in a higher degree of automatization.

These and other aspects of the present invention will become apparent from and elucidated with reference to the embodiments described hereinafter.

Exemplary embodiments of the present invention will be described in the following with reference to the following drawings.

Figure 1:
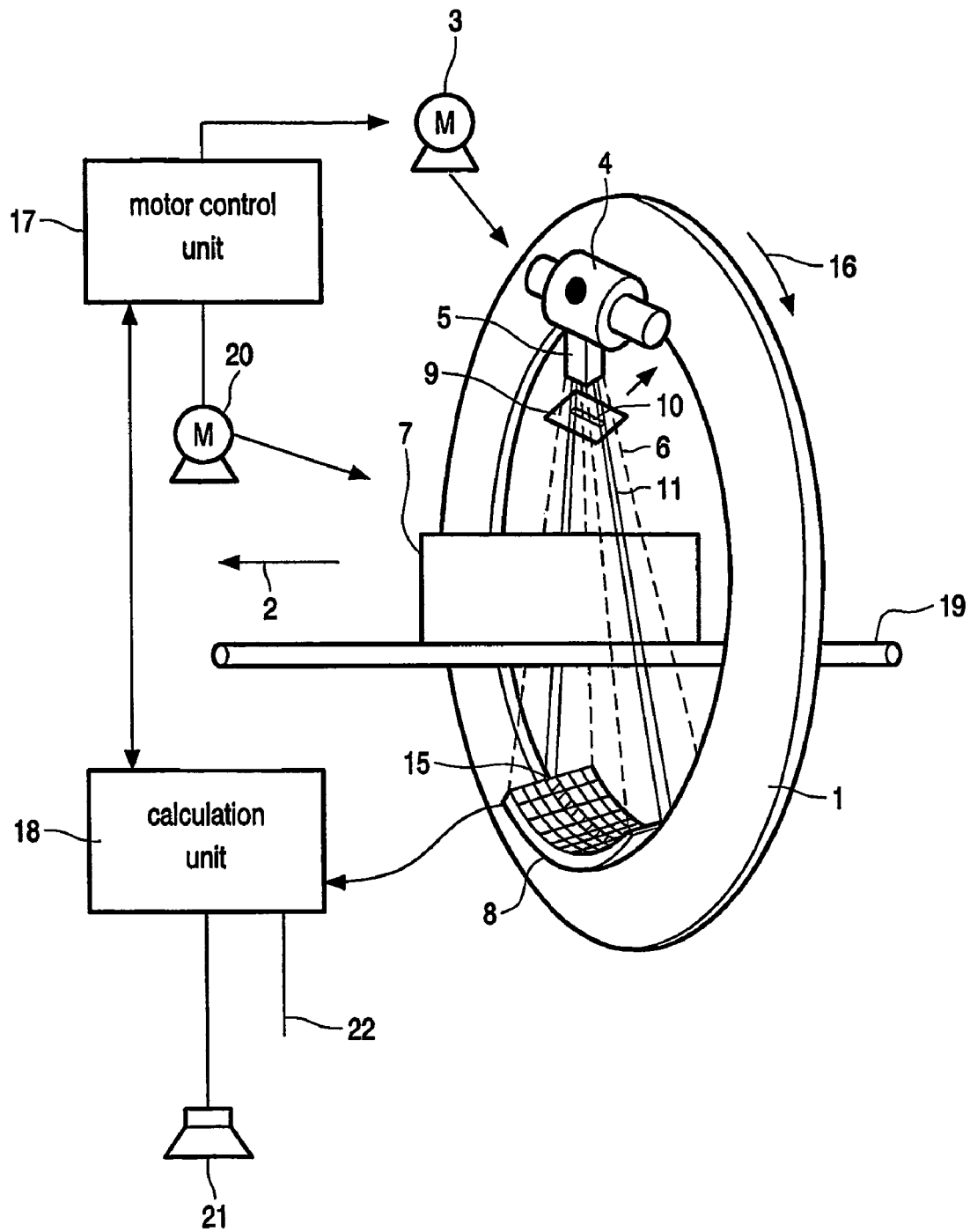
FIG. 1 shows a schematic representation of an exemplary embodiment of a computer tomograph according to the present invention as it may be used for baggage inspection.

FIG. 1 shows a schematic representation of an exemplary embodiment of a computer tomograph according to the present invention. The computer tomograph depicted in FIG. 1 comprises a gantry 1, which is rotatable around a rotation axis 2. The gantry 1 is driven by means of a motor 3. Reference character 4 designates a source of radiation such as an x-ray source.

Reference character 5 designates a first aperture system which forms the radiation beam emitted from the radiation source 4 to a cone shaped radiation beam 6 passing through the item of baggage 7. After passing through the item of baggage 7, the cone beam 6 impinges onto a detector array 8. The aperture system 5 is arranged such that the cone beam 6 covers the whole of the detector 8.

Furthermore, there is provided another aperture system 9 consisting of a diaphragm. The diaphragm has the form of a slit 10 such that the radiation emitted from the source of radiation 4 is formed into a fan beam 11.

The fan beam 11 and the cone beam 6 pass through the item of baggage 7 arranged in the center of the gantry 1 and impinge on to the detector 8. As shown in FIG. 1, the detector is attached to the gantry 1 opposite to the radiation source 4. The detector 8 consists of a two-dimensional detector array comprising a plurality of elements arranged in the form of a matrix. The individual detector elements are arranged in lines and columns. The columns are parallel to the rotation axis 2 whereas the lines are arranged in planes perpendicular to the rotation axis 2.

The apertures of the aperture systems 5 and 9 are adapted to the dimensions of the detector 8 such that the scanned area of the item of baggage 7 is within the cone beam 6 or the fan beam 11 and that the detector 8 covers the complete scanning area. As may be taken from FIG. 1, preferably the slit 10 of the aperture system 9 is arranged such that the fan beam 11 is mapped on the middle line 15 of the detector 8.

During a scan of the item of baggage 7, the radiation source 4, the aperture systems 5 and 9 and the detector 8 are rotated along the gantry 1 in the direction indicated with arrow 16. For rotation of the gantry 1 with the source of radiation 4, the aperture systems 5 and 9 and the detector 8, the motor 3 is connected to a motor control unit 17 which is connected to a calculation unit 18.

In FIG. 1, the item of baggage 7 is disposed on a conveyer belt 19. During the scan of the item of baggage 7, while the gantry 1 rotates around the item of baggage 7, the conveyer belt 19 displaces the item of baggage 7 along a direction parallel to the rotation axis 2 of the gantry. By this, the item of baggage 7 is scanned along a helix. The conveyor belt can also be stopped during the scan thus measuring single slices.

The detector 8 is connected to the calculation unit 18. The calculation unit 18 receives the detection results from the detector 8 and determines a scanning result on the basis of the detection results from the detector 8. In addition to that, the calculation unit 18 communicates with the motor control unit 17 in order to coordinate the movement of the gantry 1 with the motors 3 and 20 or with the conveyer belt 19. Furthermore, there is provided a loud speaker 21 connected to the calculation unit 18 for issuing an alarm in case the calculation unit determines that there is a dangerous material within the item of baggage 7 or a material which cannot be determined. A data port 22 can transport the alarm signal to a subsequent detection level.

As may be seen from FIG. 1, depending on which of the aperture systems 5 and 9 is in use, the computer tomograph of FIG. 1 can either be a conventional scanner or a CSCT-scanner: in case the aperture system 5 is active, the computer tomograph is a CT-scanner and in case the aperture system 9 is active, the computer tomograph is a CSCT-scanner.

Figure 2A:
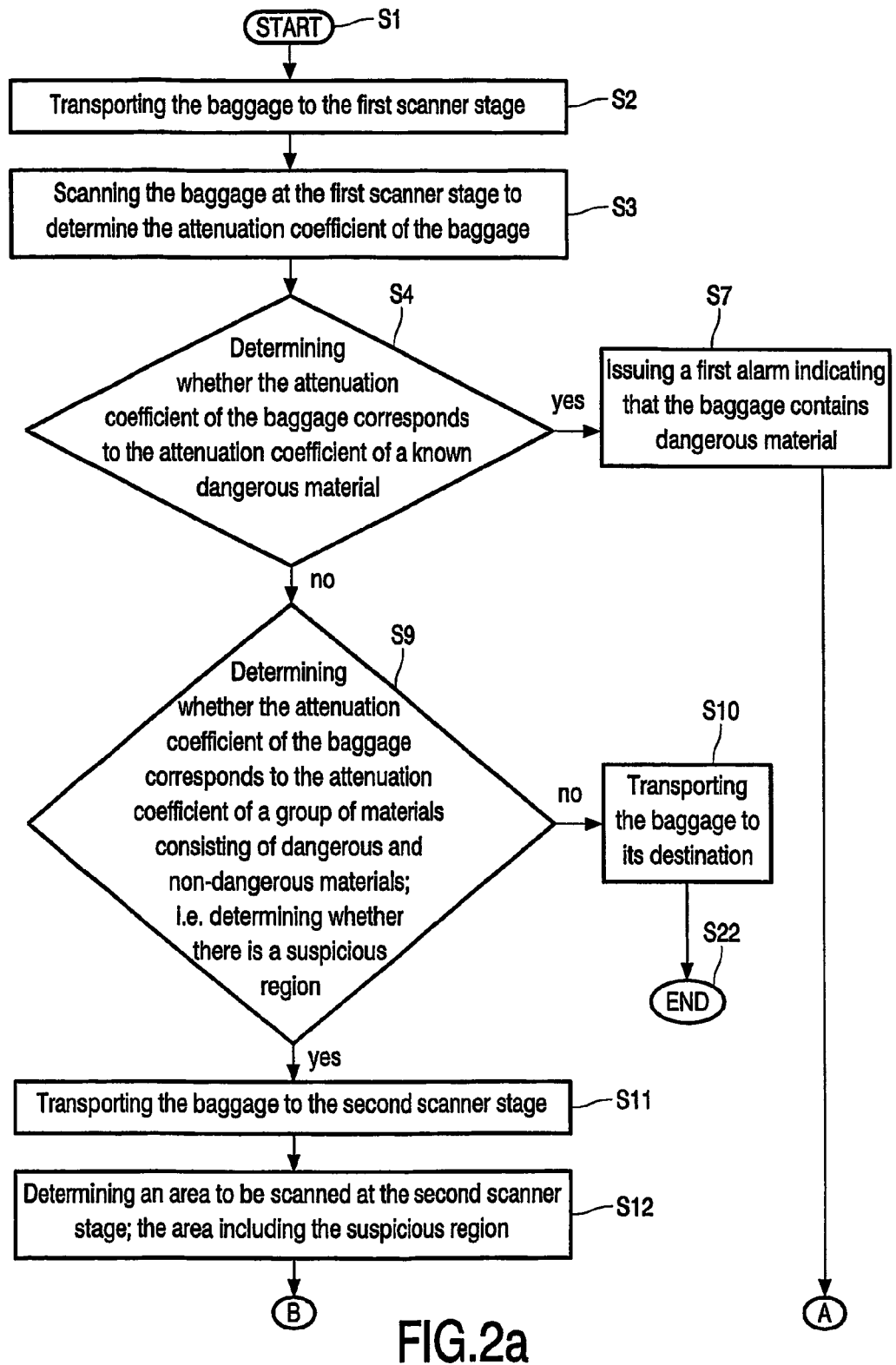
FIGS. 2a, 2b show a flow-chart of an exemplary embodiment of a method for operating the computer tomograph of FIG. 1 or the computer tomograph of FIG. 3.
Figure 2B:
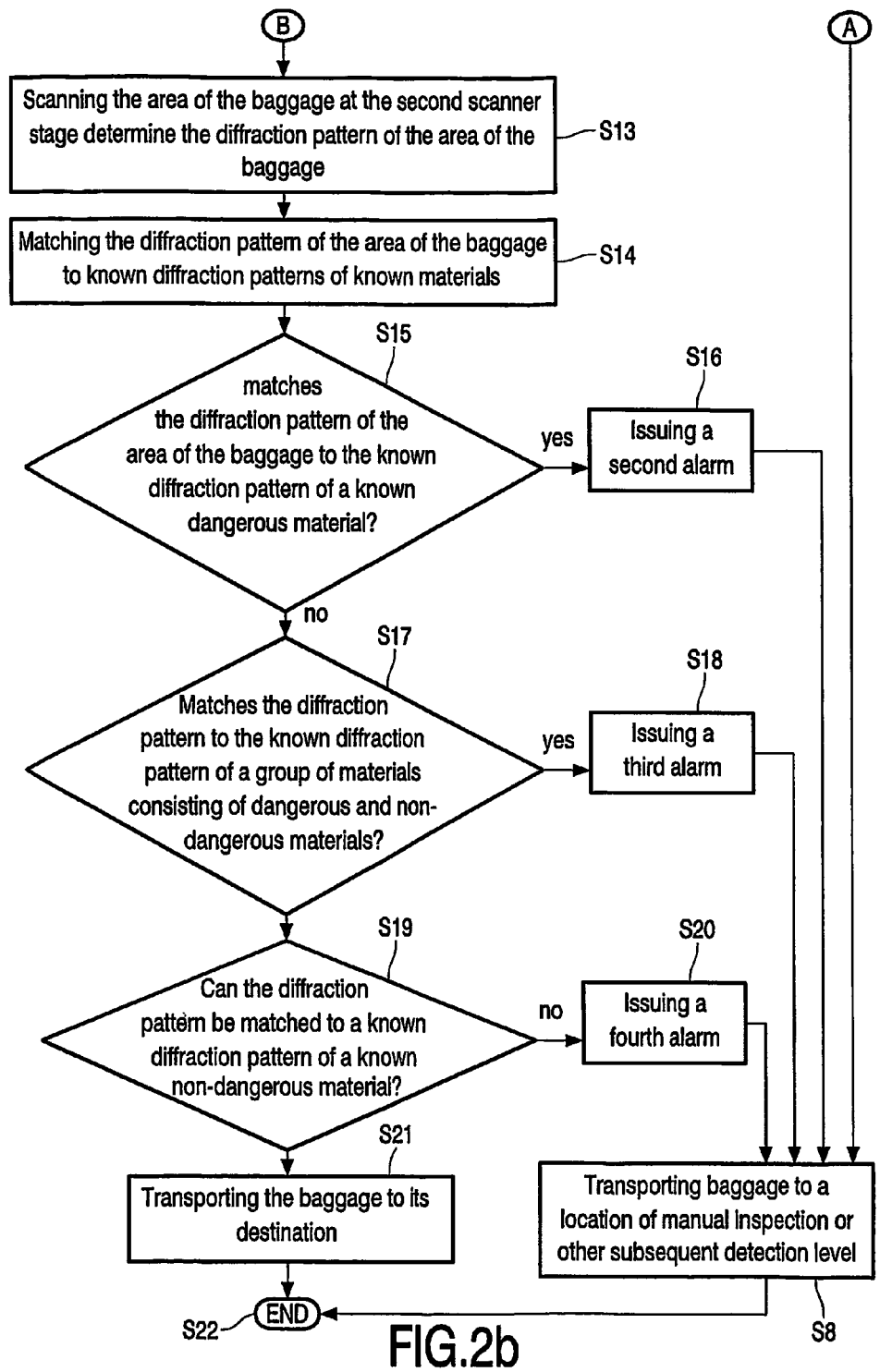

FIGS. 2a and 2b are a flow-chart of an exemplary embodiment of a method for operating the computer tomograph of FIG. 1. After the start in S1, the method continues to step S2 in which the item of baggage 7 is transported to the first scanner stage by means of the conveyer belt 19. Then, the method continues to step S3 in which the item of baggage 7 is scanned at the first scanner stage to determine the attenuation coefficient of the baggage. In detail, during the scan of the item of baggage 7 at the first scanner stage, the radiation source 4 and the detector 8 on the gantry 1 are rotated around the item of baggage 7. During this, the conveyer belt 19 moves the item of baggage 7 through the scan area covered by the cone beam 6 emitted by the radiation source 4 with the aperture system 5 such that the item of baggage 7 is scanned in its entire length. Due to the movement of the item of baggage 7 on the conveyer belt 19 and the rotation of the gantry, the item of baggage 7 is scanned along a scanning helix. The detection results of the detector 8 are transmitted to the calculation unit. Then, the method continues to step S4 where the calculation unit 18 determines whether the attenuation coefficient of the item of baggage 7 determined from detection results of the detector 8 corresponds to the attenuation coefficient of a known dangerous material. For this, the determined attenuation coefficient of the item of baggage 7 is compared to a table of attenuation coefficients of known dangerous materials. In case it is determined in step S4 that the attenuation coefficient of the baggage 7 corresponds to the attenuation coefficient of a known dangerous material, the method continues to step S7 where the calculation unit 18 issues a first alarm by means of the loudspeaker 21 indicating that the item of baggage 7 contains dangerous material. Then, from step S7 the method continues to step S8 as indicated by the encircled A at the bottom of FIG. 2 a and at the top of FIG. 2b.

At step S8, the item of baggage 7 is transported to a location where a manual inspection or a different subsequent threat detection method is carried out. From step S8 the method continues to step S22 where it ends.

In case it is determined in step S4 that the attenuation coefficient of the item of baggage 7 does not correspond to the attenuation coefficient of a dangerous material, the method continues to step S9 where the calculation unit 18 determines whether the attenuation coefficient of the item of baggage 7 corresponds to the attenuation coefficient of a group of materials consisting of dangerous and non-dangerous materials. In other words, in step S9 it is determined whether there is a suspicious region which may contain dangerous material in the item of baggage 7. In case it is determined in step S9 that there is no suspicious region, i.e. that the attenuation coefficient of the item of baggage 7 does not correspond to the attenuation coefficient of a group of materials consisting of dangerous and non-dangerous materials, the method continues to step S10 where the baggage is transported to its destination by means of the conveyer belt 19. Then, after step S10, the method ends at step S22.

In case it was determined in step S9 that there is a suspicious region in the item of baggage 7, the method continues to step S11 where the item of baggage 7 is transported to the second scanner stage. In the computer tomograph of FIG. 1, the transportation step 11 is carried out such that the conveyer belt either changes its direction such that the item of baggage 7 it moved through the scanning area of the computer tomograph in a backward direction during the scan at the second scanner stage or the item of baggage 7 is returned to its initial position before the scan at the first scanner stage and then for the scan at the second scanner stage, the item of baggage 7 is again moved along a direction parallel to the rotation axis of the gantry 1 during the scan at the second scanner stage.

From step S11, the method continues to step S12 where an area is determined which is to be scanned at the second scanner stage. The area includes the suspicious region determined in step S9. Depending on whether the item of baggage was moved on the conveyer belt 19 or was deformed since the scan at the first scanner stage, the area to be scanned at the second scanner stage can be enlarged or can be limited to the suspicious region determined in step S9. Step S12 is carried out by means of the calculation unit 18. Then, as indicated by means of the encircled B at the bottom of FIG. 2a and the encircled B at the top of FIG. 2b, the method continues to step S13 where the area of the baggage determined in step S12 is scanned at the second scanner stage to determine the diffraction pattern of the area of the baggage. For this, as already indicated above, the item of baggage 7 is transported along a direction parallel to the rotation axis 2 of the gantry 1. When the suspicious region is penetrated by the fan-beam, the belt is stopped and the radiation source 4, the aperture system 9 and the detector system 8 are rotated around the item of baggage 7 by means of the gantry 1. For determining the diffraction pattern of the area of the item of baggage 7, only the scattered radiation is used by the calculation unit 18. Then, after the determination of the diffraction pattern in step S13, the method continues to step S14 where the diffraction pattern is matched to known diffraction patterns of known materials. For matching the diffraction pattern to known diffraction patterns of known materials, the diffraction pattern of the area of the item of baggage 7 is compared to a table consisting of known diffraction patterns of known materials.

After step S14, the method continues to step S15 where a query is made whether the diffraction pattern of the area of the baggage matches the known diffraction pattern of a known dangerous material. In case the diffraction pattern of the area of the baggage can be linked to a dangerous material, the method continues to step S16 where the calculation unit which performed steps S14 and S15 issues a second alarm. From step S16 the method continues to step S8.

In case it was determined in step S15 that the diffraction pattern of the area of the baggage 7 does not match a known dangerous material, the method continues to step S17.

In step S17 the calculation unit makes a query whether the diffraction pattern corresponds to the known diffraction pattern of a group of materials consisting of dangerous and non-dangerous materials. In case it is determined in step S17 that the diffraction pattern of the item of baggage 7 can be linked to a group of materials consisting of dangerous and non-dangerous materials the method continues to step S18 where the calculation unit issues a third alarm by means of the loudspeaker 21. From step S18, the method continues to step S8.

In case it was determined in step S17 that the diffraction pattern does not correspond to the diffraction pattern of a group of materials consisting of dangerous and non-dangerous materials, the method continues to step S19 where a query is made whether the diffraction pattern can be matched to a known diffraction pattern of a known non-dangerous material. In case it is determined in step S19 that the diffraction pattern of the area of the item of baggage 7 cannot be linked to a non-dangerous material the method continues to step S20 where the calculation unit 18 issues a fourth alarm by means of the loudspeaker 21. From step S20 the method continues to step S8.

In case the calculation unit 18 determines in step S19 that the diffraction pattern of the item of baggage 7 can be linked to a known non-dangerous material, the method continues to step S21 where the item of baggage 7 is transported to its destination by means of the conveyer belt 19. Then, from step S21 the method continues to step S22 where it ends.

In a variant of the method depicted in FIGS. 2a and 2b, in addition to the diffraction pattern, the calculation unit 18 may also use the attenuation coefficient to determine in steps S15, S17 and S19 whether the material included in the item of baggage 7 includes dangerous material or not.

Figure 3:
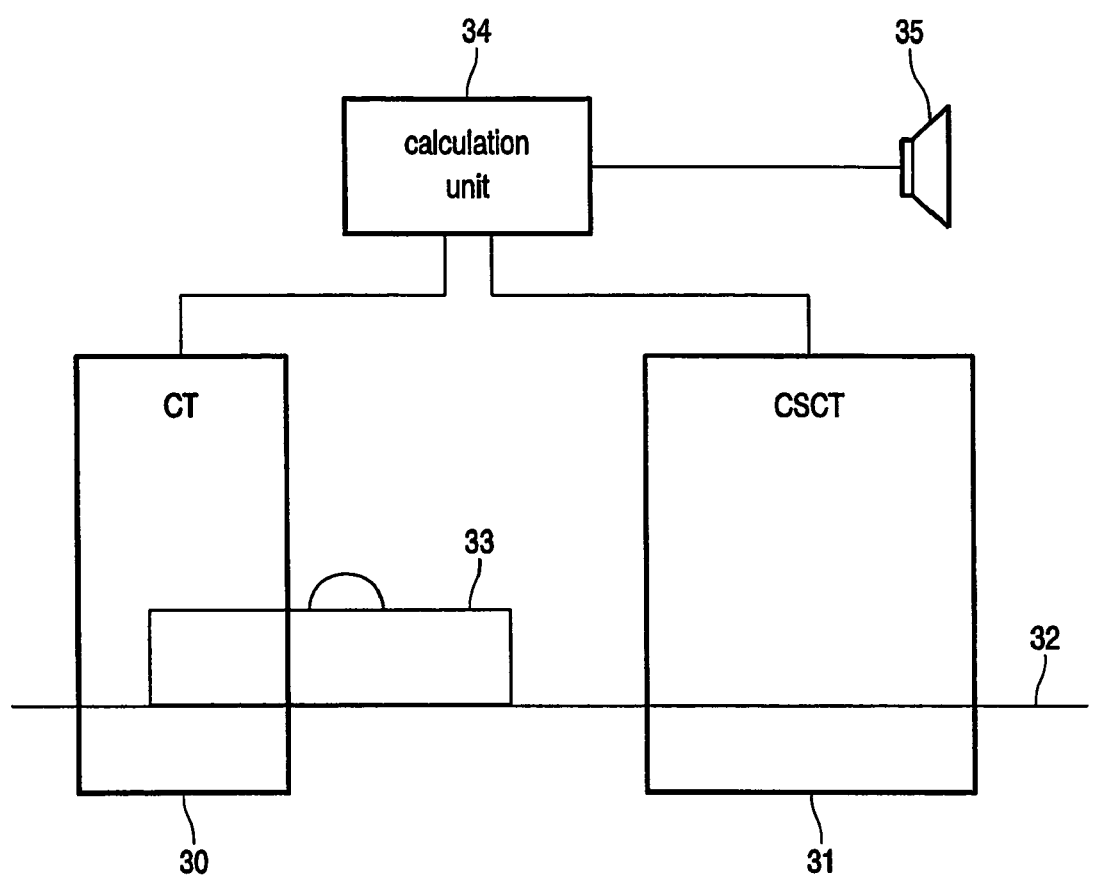
FIG. 3 shows a schematic representation of another exemplary embodiment of a computer tomograph according to the present invention.

FIG. 3 shows another exemplary embodiment of the computer tomograph according to the present invention. Reference character 30 depicts a first scanner stage comprising a CT-scanner. Reference character 31 designates a second scanner stage comprising a CSCT-scanner. Each of the CT-scanner and the CSCT-scanner comprises a radiation source and a detector system as described with reference to FIG. 1. The first scanner stage 30 and the second scanner stage 31 are connected to each other by means of a conveyer belt 32 for transporting an item of baggage 33 from the first scanner stage 30 to the second scanner stage 31.

The first scanner stage 30 and the second scanner stage 31 are connected to a calculation unit 34 which is connected to a loudspeaker 35. The item of baggage 33 to be inspected is firstly scanned at the first scanner stage 30. At the first scanner stage 30, the attenuation coefficient of the item of baggage 33 is determined and transmitted to the calculation unit 34. At the calculation unit 34, the attenuation coefficient determined at the first scanner stage 30 is compared to a table of known attenuation coefficients of known materials. In case the attenuation coefficient of the item of baggage 33 can be matched to the known attenuation coefficient of a dangerous material, the calculation unit issues a first alarm by means of the loudspeaker 35.

In case the attenuation coefficient of the item of baggage 33 can be matched to an attenuation coefficient of a non-dangerous material, the calculation unit controls the operation of the conveyer belt 32 such that the item of baggage 33 is transported to its destination. In case the item of baggage 33 passes the second scanner stage 31 on its path to its destination, the calculation unit 34 controls the second scanner stage 31 such that no scan is performed at the second scanner stage 31 if it was determined that there is only non-dangerous material in the item of baggage 33.

In case the calculation unit 34 matches the attenuation coefficient of the item of baggage 33 to the known attenuation coefficient of a group of materials consisting of dangerous and non-dangerous materials, the calculation unit 34 controls the conveyer belt 32 such that the item of baggage 33 is transported to the second scanner stage 31 where the item of baggage 33 is scanned by means of the CSCT-scanner. On the basis of the scanning results, a diffraction pattern is determined at the second scanner stage 31, which is transmitted to the calculation unit 34. Then, the calculation unit 34 compares the diffraction pattern of the item of baggage 33 to known diffraction patterns of known materials. In case the diffraction pattern of the item of baggage can be linked to dangerous materials, the calculation unit 34 issues a further alarm by means of the loudspeaker 35. In case the calculation unit 34 links the diffraction pattern of the item of baggage 33 to non-dangerous materials, the calculation unit 34 controls the conveyer belt 32 such that the item of baggage 33 is transported to its destination.

In case the diffraction pattern of the item of baggage 33 is linked to a group of materials consisting of dangerous and non-dangerous materials, the calculation unit 34 issues a further alarm by means of the loudspeaker 35 and controls the conveyer belt 32 such that the item of baggage 33 is transported to a further point of inspection where the item of baggage 33 is inspected by a person.

Despite of the fact that the above method and apparatus are described with respect to baggage inspection, the above method and apparatus may for example also be used in medical applications where is can be used to distinguish between healthy and non-healthy tissue.

In case the above methods and apparatus are applied in the field of baggage inspection, a false alarm rate can be reduced significantly and by this a higher degree of automization can be achieved.

The invention claimed is:

1. An inspection system for detecting a specific material of interest in an item of baggage, the inspection system comprising:
    a first scanner system for determining an attenuation coefficient of the item of baggage;
    a second scanner system for determining a diffraction pattern of the item of baggage; and
    a calculation unit connected to the first and second scanner systems for identifying a presence of the specific material of interest in the item of baggage on the basis of the attenuation coefficient and the diffraction pattern, wherein the first and second scanner systems are arranged at a distance from each other,
    wherein the first scanner system is a computed tomograph configured to apply a fan-shaped or cone-shaped radiation beam to the item of baggage; and
    wherein the second scanner system is a coherent-scatter computed tomograph configured to apply a fan shaped radiation beam to the item of baggage.

2. A method of inspecting an item of baggage, the method comprising the acts of:
    arranging a first scanner and a second scanner at a distance from each other;
    scanning the item of baggage at the first scanner with a first radiation beam for determining an attenuation coefficient of the item of baggage;
    determining whether there is a suspicious region in the item of baggage on the basis of the attenuation coefficient;
    scanning an area of the item of baggage including the suspicious region at the second scanner, wherein the act of scanning the area is performed with a second radiation beam for determining a diffraction pattern of the area;
    determining whether there is a dangerous material in the item of baggage on the basis of the diffraction pattern; and
    generating a signal indicative of the dangerous material,
    wherein the attenuation coefficient is determined with a computed tomograph where the first radiation beam is cone-shaped; and
    wherein the diffraction pattern is determined with a coherent-scatter computed tomograph where the second radiation beam is fan-shaped.

3. The method of claim 2, wherein the suspicious region is determined when the attenuation coefficient corresponds to a group of materials consisting of dangerous materials and non-dangerous materials.

4. The method of claim 2, further comprising the acts of:
    issuing a first alarm in case when the attenuation coefficient corresponds to a dangerous material;
    transporting the item of baggage to its destination in case no suspicious region or dangerous material has been determined on the basis of the attenuation coefficient;
    issuing a second alarm in case a dangerous material has been identified on the basis of the diffraction pattern; and
    issuing a third alarm in case the diffraction pattern cannot be matched to a known material.

5. The method of claim 2, further comprising the acts of:
- determining that the suspicious region is harmless in case the diffraction pattern corresponds to non-dangerous material; and
- transporting the item of baggage to its destination.

6. A computer readable medium comprising a computer program wherein, when the computer program is executed on an inspection system for inspecting items of baggage, the inspection system performs the acts of:
- scanning the item of baggage at a first scanner stage with a first radiation beam for determining an attenuation coefficient of the item of baggage;
- determining whether there is a suspicious region in the item of baggage on the basis of the attenuation coefficient;
- scanning an area of the item of baggage including the suspicious region at a second scanner stage, wherein the act of scanning the area in performed with a second radiation beam for determining a diffraction pattern of the area, and wherein the first and second scanner stages are arrange at a distance from each other;
- determining whether there is a dangerous material in the item of baggage on the basis of the diffraction pattern; and
- generating a signal indicative of the dangerous material,
- wherein the attenuation coefficient is determined with a computed tomograph where the first radiation beam is cone-shaped; and
- wherein the diffraction pattern is determined with a coherent-scatter computed tomograph where the second radiation beam is fan-shaped.

* * * * *